(12) United States Patent
Cooper

(10) Patent No.: US 8,964,288 B2
(45) Date of Patent: Feb. 24, 2015

(54) SYSTEMS FOR CHROMATIC ABERRATION CORRECTION IN TOTAL INTERNAL REFLECTION FLUORESCENCE MICROSCOPY

(75) Inventor: Jeremy R. Cooper, Issaquah, WA (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 469 days.

(21) Appl. No.: 13/338,664

(22) Filed: Dec. 28, 2011

(65) Prior Publication Data

US 2012/0176672 A1 Jul. 12, 2012

Related U.S. Application Data

(60) Provisional application No. 61/432,020, filed on Jan. 12, 2011.

(51) Int. Cl.
*G02B 21/08* (2006.01)
*G02B 21/16* (2006.01)
*G02B 27/00* (2006.01)
*G02B 21/00* (2006.01)

(52) U.S. Cl.
CPC ............ *G02B 21/16* (2013.01); *G02B 27/0025* (2013.01); *G02B 21/0076* (2013.01)
USPC ........................................................ 359/385

(58) Field of Classification Search
None
See application file for complete search history.

(56) References Cited

U.S. PATENT DOCUMENTS 6,693,742 B1 * 2/2004 Winterot et al. .............. 359/381
8,378,314 B2 * 2/2013 Matthae et al. ............ 250/458.1

FOREIGN PATENT DOCUMENTS

WO WO 2009135607 A1 * 11/2009

* cited by examiner

*Primary Examiner* — Derek S Chapel
(74) *Attorney, Agent, or Firm* — Yonggang Ji

(57) ABSTRACT

Correction elements that can be incorporated in objective-based TIRF microscopy instruments to correct for chromatic aberrations are described. A correction element can be placed between a multiple wavelength excitation beam source and the microscope objective lens. In one aspect, the thickness of the correction element is defined to compensate for different axial positions of the focal points associated with each excitation wavelengths traveling along the outer edge of lenses comprising a microscope objective lens. In another aspect, the correction element can be angled and/or configured so that the different wavelengths of multiple wavelength excitation light are shifted to adjust the angle of incidence for each wavelength at the specimen/substrate interface.

6 Claims, 14 Drawing Sheets

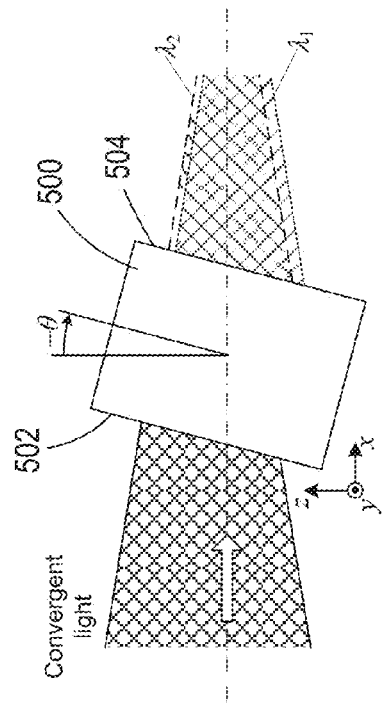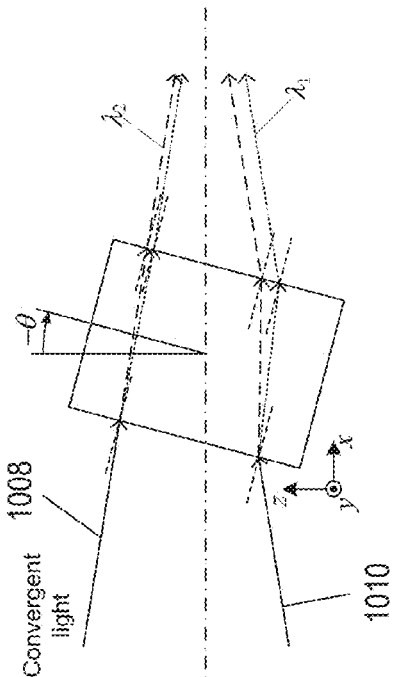
FIG. 10A
FIG. 11A
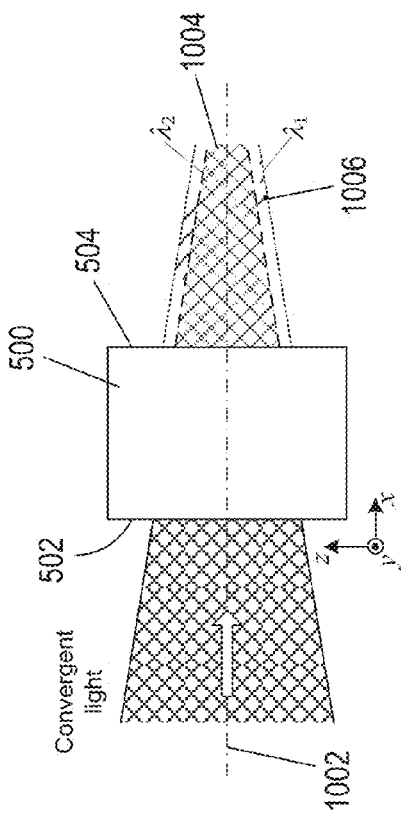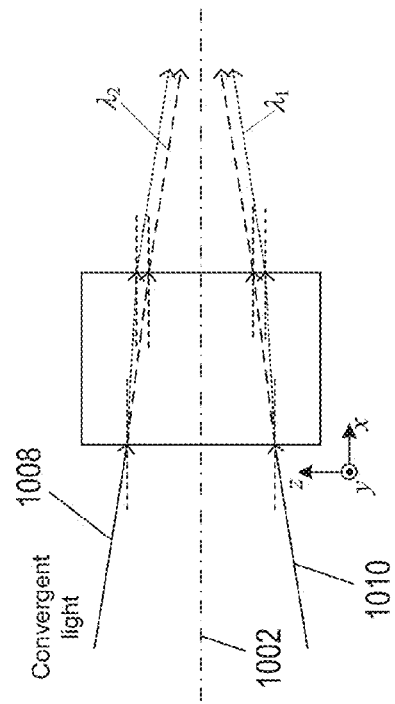
FIG. 10B
FIG. 11B

SYSTEMS FOR CHROMATIC ABERRATION CORRECTION IN TOTAL INTERNAL REFLECTION FLUORESCENCE MICROSCOPY

CROSS-REFERENCE TO RELATED APPLICATIONS

This application claims priority to U.S. provisional patent application No. 61/432,020 filed Jan. 12, 2011, the disclosure of which is incorporated herein by reference in its entirety.

TECHNICAL FIELD

This disclosure relates to fluorescence microscopy and, in particular, to systems that correct chromatic aberrations in total internal reflection fluorescence microscopy.

BACKGROUND OF THE INVENTION

Many different techniques have been developed in the field of fluorescence microscopy to restrict excitation light to a thin region of a specimen in order to improve the signal-to-background noise ratio and the spatial resolution of specimen features or components of interest. Total internal reflection fluorescence ("TIRE") microscopy is a technique in which a beam of excitation light is restricted to a thin region of the specimen adjacent to the interface between the specimen and a transparent substrate, such as a slide, coverslip or dish. The excitation light is transmitted into the substrate and strikes the interface at a nonzero angle of incidence. When the angle of incidence is larger than a critical angle with respect to the interface normal, the light experiences total internal reflection. In other words, if the refractive index of the specimen is lower than that of the substrate and the angle of incidence is greater than the critical angle, no excitation light can pass into the specimen and the excitation light is reflected back into the substrate. But, the reflected light generates an electromagnetic field that penetrates beyond the interface into the specimen as an evanescent wave with the same wavelength as the excitation light that excites fluorescence within a thin region of the specimen near the interface. Objective-based TIRF microscopes direct the excitation light along the outer edge of the objective lenses so that light exits the objective and strikes the interface with an angle of incidence greater than the critical angle. These instruments, which use oil-immersion objectives with a high numerical aperture, are increasing in popularity because they can be used to image live cell specimens in coverslip-bottom dishes.

On the other hand, objective-based TIRF microscopes present several challenges when dealing with multiple wavelength TIRF. For instance, multiple wavelength TIRF microscopes use a multiple wavelength excitation beam directed along the outer edge of the objective lenses, but the outer edges of the lenses cause chromatic aberrations in the beam. One technique used to account for chromatic aberrations is to switch between the different excitation wavelengths by mechanically steering and refocusing the multiple wavelength beam so that a selected wavelength strikes the interface with an angle of incidence greater than the critical angle. However, steering and refocusing the beam for each wavelength takes time, prevents simultaneous imaging with more than one wavelength, and requires additional mechanical systems to change the position of the excitation beam source, which increases the cost of an objective-based TIRF microscope. For the above described reasons, engineers, scientists, and fluorescent microscope manufacturers continue to seek fast, efficient, and cost effective systems that correct for chromatic aberrations in multiple wavelength TIRF microscopy.

SUMMARY OF THE INVENTION

Correction elements that can be inserted into the path of a multiple wavelength excitation beam of an objective-based TIRF microscopy instrument to correct for chromatic aberrations are described. A correction element can be placed between a multiple wavelength excitation beam source and the microscope objective lens. In one aspect, the thickness of the correction element is defined to compensate for different axial positions of the focal points associated with each excitation wavelengths traveling along the outer edge of lenses comprising a microscope objective lens. In another aspect, the correction element can be angled and/or configured so that the different wavelengths of multiple wavelength excitation light are shifted to adjust the angle of incidence for each wavelength at the specimen/substrate interface.

BRIEF DESCRIPTION OF THE DRAWINGS

FIGS. 10A-10B show cross-sectional views of a correction element in the path of convergent light.

FIGS. 11A-11B show cross-sectional views of a correction element in the path of convergent light and rotated through an angle.

DETAILED DESCRIPTION OF THE INVENTION

A general description of two kinds of problems associated with chromatic aberrations created in objective-based total internal reflection fluorescence ("TIRF") microscopy is presented in a first subsection. A description of various correction elements that can be incorporated into objective-base TIRF microscopy instruments to correct various types of chromatic aberrations is presented in a second subsection.

Figure 1:
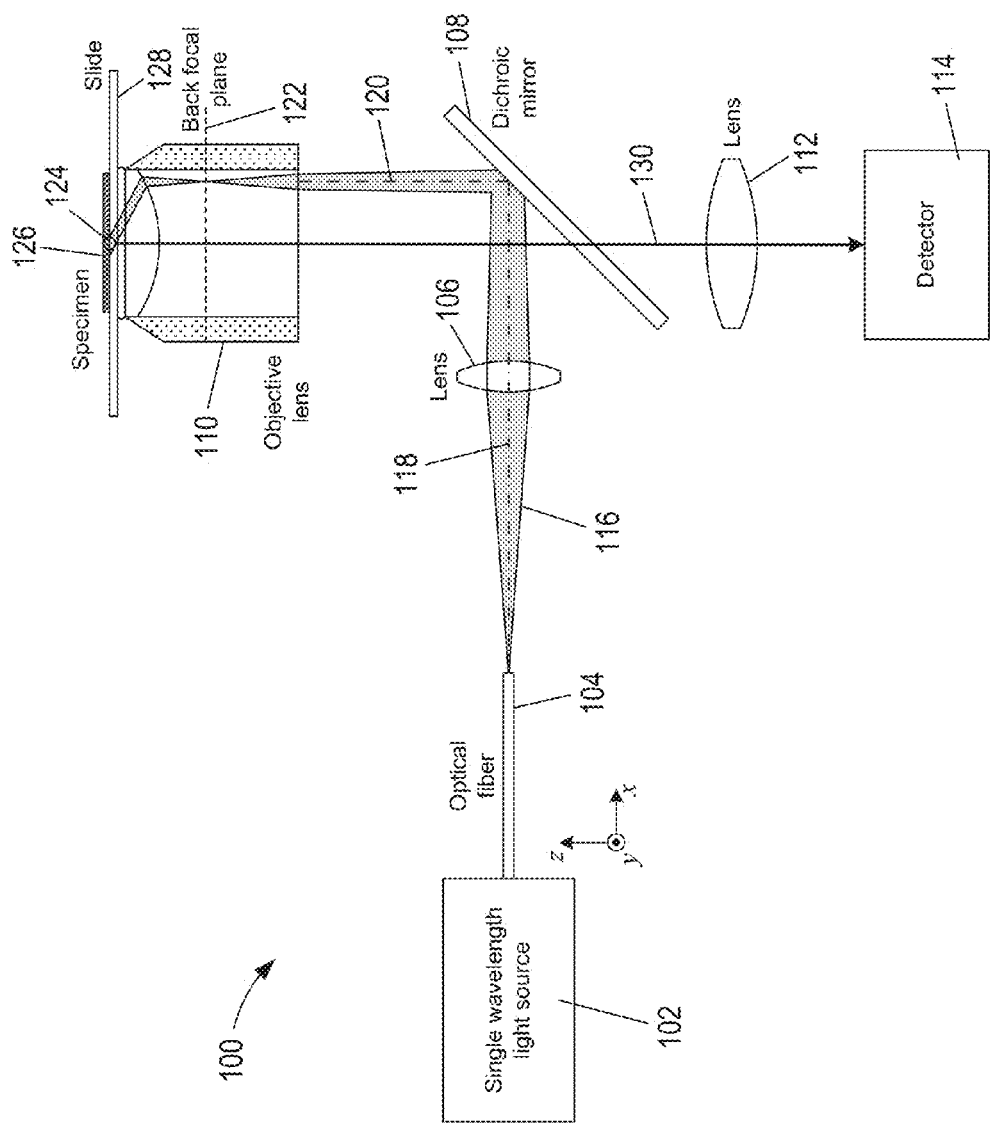
FIG. 1 shows a schematic representation of an example total internal reflection fluorescence ("TIRF") microscopy instrument that does not include a correction element.

Two Problems Created by Chromatic Aberrations in Multiple-Wavelength Objective-Based TIRF Microscopy FIG. 1 shows a schematic representation of an example TIRF microscopy instrument 100 that does not include a correction element. Note that the instrument 100 is not intended to represent all of the various types of TIRF microscopy instruments. There are many different types of TIRF microscopy instruments and corresponding optical paths. Instrument 100 is also not intended to represent the optical paths within all the different, well-known variations of TIRF microscopy instruments, but is instead provided to illustrate the general principals of a TIRF microscopy instrument and to introduce two problems associated with chromatic aberrations created in an objective lens. The instrument 100 includes a single wavelength light source 102, an optical fiber 104, a first lens 106, a dichroic mirror 108, an objective lens 110, a second lens 112, and a detector 114. The source 102 outputs light 116 of one wavelength into the optical fiber 104. The light 116 diverges or spreads out as the light passes through the lens 106 and is refocused by the lens 106 before the light is reflected off of the dichroic mirror 108 along a second optical axis 120 that passes through the objective lens 110 along the outer edge of the lenses (not shown) comprising the objective lens 110. In practice, more than one lens 106 and additional mirrors can be used to direct and control the path of light output from the end of the fiber 104 and input the light to the objective lens 110. The objective lens 110 focuses the excitation beam near the back focal plane 122 of the objective lens 110. Objective-based TIRF microscopes direct the beam of excitation light along the outer edge of the objective lenses so that light exits the objective lens 110 and strikes the interface 124 between a specimen 126 and slide 128 with an angle of incidence greater than the critical angle, as described below with reference to FIG. 2. Directional arrow 130 represents a beam of fluorescent light emitted from the specimen 126 near the interface 124. The beam 130 is formed by the objective lens 110, passes through the dichroic mirror 108, and is focused by the lens 112 onto the detector 114. The detector 114 can be a photomultiplier, photodiode, a solid-state charged coupled device ("CCD") camera or a CMOS camera.

Figure 2:
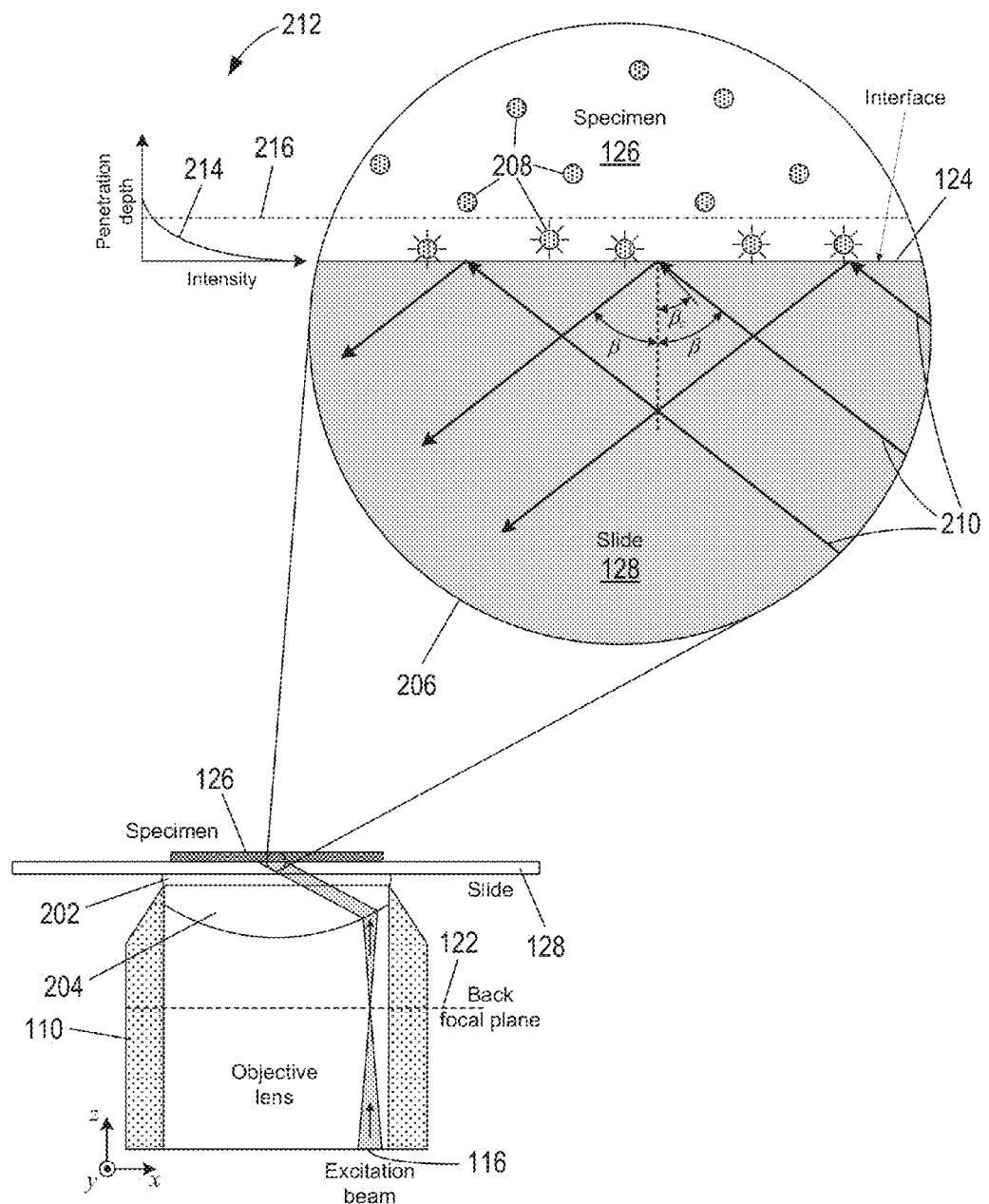
FIG. 2 shows a schematic representation of an objective lens and an enlargement of a specimen/slide interface.

FIG. 2 shows a schematic representation of the objective lens 110 used to illuminate the specimen 126 disposed on the slide 128. The objective lens 110 is an oil immersion objective with immersion oil 202 disposed between the slide 128 and a convex-plano lens 204 of the objective lens 110. The objective lens 110 has a high numerical aperture ("NA") in order to allow the excitation light 116 to be transmitted near the perimeter of the lenses of the objective lens 110 and directed into the slide 128 with an angle of incidence that supports total internal reflection. The slide 128 and oil 202 have nearly the same refractive index of approximately 1.52, and the specimen 126 can be in an aqueous medium with a refractive index of approximately 1.33-1.40, which supports total internal reflection within the slide 128. The NA of the objective lens 110 is higher than the refractive index of the specimen (e.g., $n_D > 1.33$ for aqueous mounts). FIG. 2 includes a magnified view 206 of the slide 128/specimen 126 interface 124, which reveals that the specimen 126 includes a number of fluorescently labeled components 208. Rays 210 represent the direction at which the excitation light 116 strikes the interface 124 with an angle of incidence $\beta$, which is greater than critical angle $\beta_c$. As a result, the excitation beam 116 is reflected back into the slide 128 at the interface 124. Although the excitation beam 116 is not transmitted into the specimen 126, the reflected light creates an electromagnetic field in the specimen 126, called an "evanescent field," adjacent to the interface 124. The wavelength of the evanescent field is identical to that of the excitation light 116, but the intensity of the evanescent field decays exponentially as the field penetrates into the specimen 126, as represented by plot 212. Curve 214 represents an exponential decay in the intensity of the evanescent field as the penetration depth increases. Fluorophores of fluorescently labeled components located within the vicinity of the interface 124 can be excited by the evanescent field, which is typically limited to approximately 100 nanometers in thickness, as represented by dashed line 216. A portion of the fluorescent light emitted from fluorophores near the interface 124 is captured and collimated by the objective lens 110.

Figure 3:
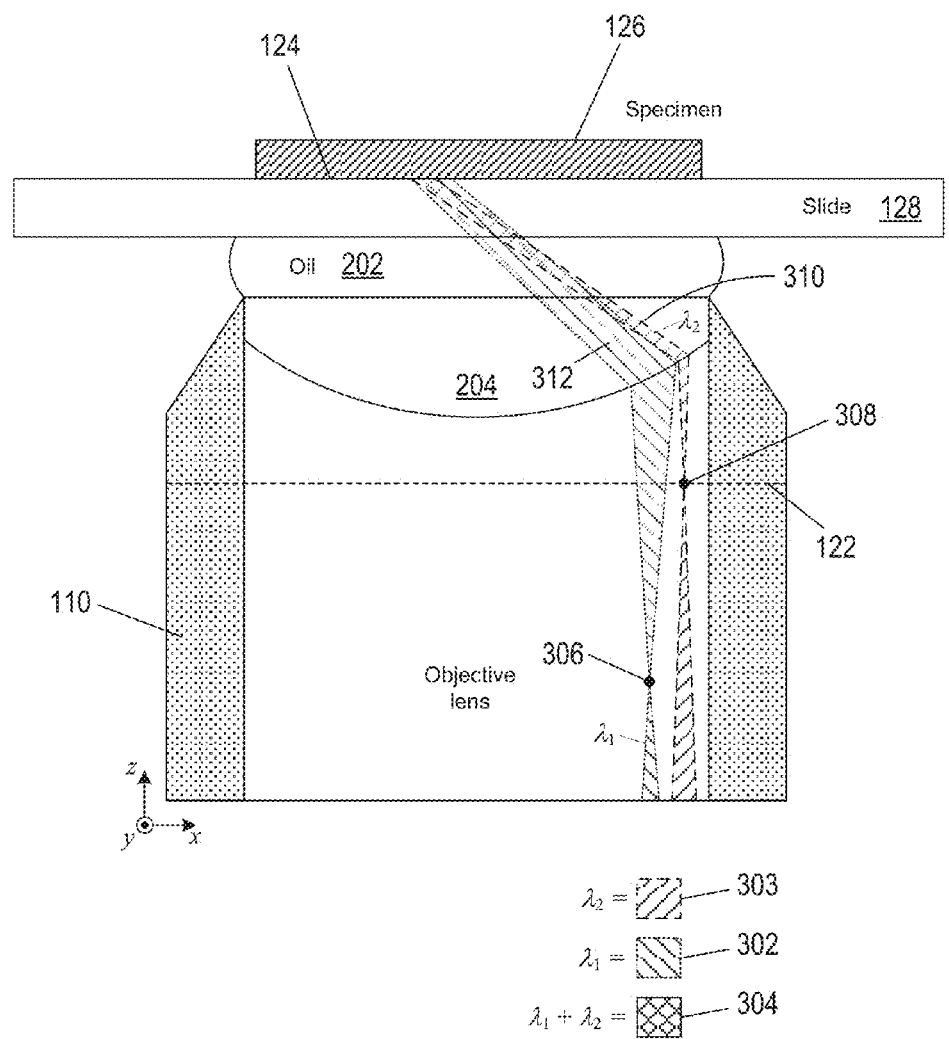
FIG. 3 shows an enlargement of an example objective lens and a representation of the two separate problems that arise as a result of chromatic aberrations.

However, when the single wavelength light source 102, shown in FIG. 1, is replaced by a multiple wavelength light source, the excitation light 116 is composed of two or more wavelengths that are simultaneously directed down the outer edges of the lenses of the objective lens 110. The edges of the lenses cause divergence in the different wavelengths, resulting in a substantial chromatic aberration that presents two major problems when attempting to illuminate a specimen near the interface:

Problem 1. The different wavelengths are focused at different axial positions within the objective lens. As a result, light of only one wavelength is typically collimated as the light exits the objective lens. FIG. 3 shows an enlargement of the objective lens 110. For the sake of simplicity, the excitation light 116 is composed of two different wavelengths, denoted by $\lambda_1$ and $\lambda_2$, from different regions of the visible portion of the electromagnetic spectrum with the wavelength $\lambda_1$ less than the wavelength $\lambda_2$. Differently shaded boxes 302 and 303 represent the separate wavelengths $\lambda_1$ and $\lambda_2$ in FIG. 3 and in subsequent Figures. Cross-hatching as represented in box 304 represents where the different wavelengths $\lambda_1$ and $\lambda_2$ overlap or mix. As shown in FIG. 3, the objective lens 110 causes the two different wavelengths to axially separate. Spot 306 represents the focal point of the wavelength $\lambda_1$ and spot 308 represents the focal point of the wavelength $\lambda_2$. In other words, chromatic aberrations in the objective lens cause the two different wavelengths to focus at different axial positions along the edge of the objective lens 110, as represented by the spots 306 and 308. As a result, light with the wavelength $\lambda_2$ has a focal point 308 near the back focal plane 122 and strikes the interface 124 with a corresponding collimated beam 310. On the other hand, light with the wavelength $\lambda_1$ reaches the interface with a convergent beam 312 because the beam 312 has a focal point 306 upstream of the back focal plane 122. The converging beam 312 results in a range of incidence angles across the field of view, which, in turn, produces a non-uniform evanescent field.

Problem 2. The nominal angle of incidence on the interface varies according to the wavelength. For example, FIG. 3 also reveals that the angles of incidence for the two wavelengths are different. Light with the wavelength $\lambda_2$ represented by beam 310, takes a more peripheral trajectory through the objective lens 110 and strikes the interface 124 with a substantially larger angle of incidence than the beam 312. As a result, light with wavelength $\lambda_2$ has a shallower evanescent field depth than light with wavelength $\lambda_1$.

TIRF Microscopy Instruments with Chromatic Aberration Correction

Figure 4:
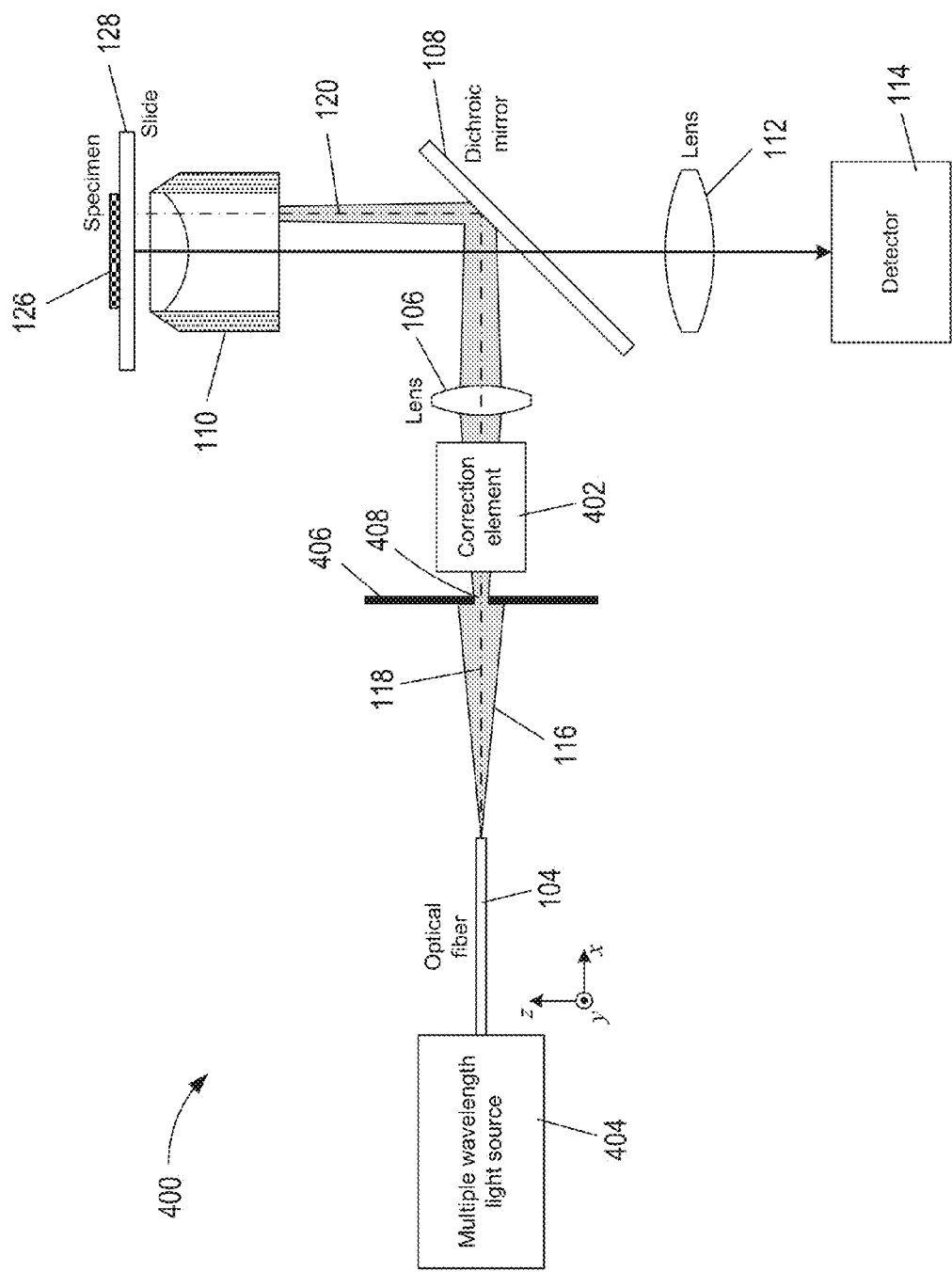
FIG. 4 shows a schematic representation of an example TIRF microscopy instrument that includes a correction element in the path of divergent excitation light.

FIG. 4 shows a schematic representation of an example TIRF microscopy instrument 400 that includes a correction element 402. The instrument 400 is similar to the instrument 100 except the single wavelength light source 102 has been replaced by a multiple wavelength light source 404 and the instrument 400 includes a plate 406 with an aperture 408 located between the optical fiber 104 and the correction element 402. The plate 406 is positioned substantially perpendicular to the optical axis 118 so that the excitation light 116 passes through the aperture 408. As described above with reference to the instrument 100, the instrument 400 is not intended to represent all of the various types of TIRF microscopy instruments in which the correction element 402 can be incorporated. There are many different types of TIRF microscopy instruments and corresponding optical paths along which a correction element can be inserted in order to correct for chromatic aberrations in an objective lens. In the example of FIG. 4, the light 116 output from the source 404 is composed of a mixture of at least two wavelengths. The light 116 diverges or spreads out as the light 116 is output from the fiber 104. The plate 406 is inserted into the path of the light 116 to trim or remove an outer portion of the divergent light 116 so that the light 116 reaches the correction element 402 with a desired divergent cone angle. The correction element 402 separates the wavelengths so that when the light 116 reaches the objective lens 110, the wavelengths are transmitted along the edge of the lenses of the objective lens 110 in a manner that accounts for the chromatic aberration created by the objective lens 110. In general, the correction element 402 can be a parallelpiped object composed of at least one transparent material and has two highly-polished, substantially parallel surfaces that intersect the optical axis 118. For example, the element 402 can be composed of a glass, such as lanthanum dense flint glass, dense flint glass, flint glass, barium crown glass, borosilicate crown glass, or fluorite crown glass. Alternatively, the element 402 can be composed of a transparent polymer. The transparent material of the element 402 and thickness of the material between the two parallel surfaces is selected to produce a different refraction in each of the wavelengths comprising the light 116, which, in turn, results in a downstream affect on the different wavelengths that substantially corrects Problems 1 and 2.

Figure 5A:
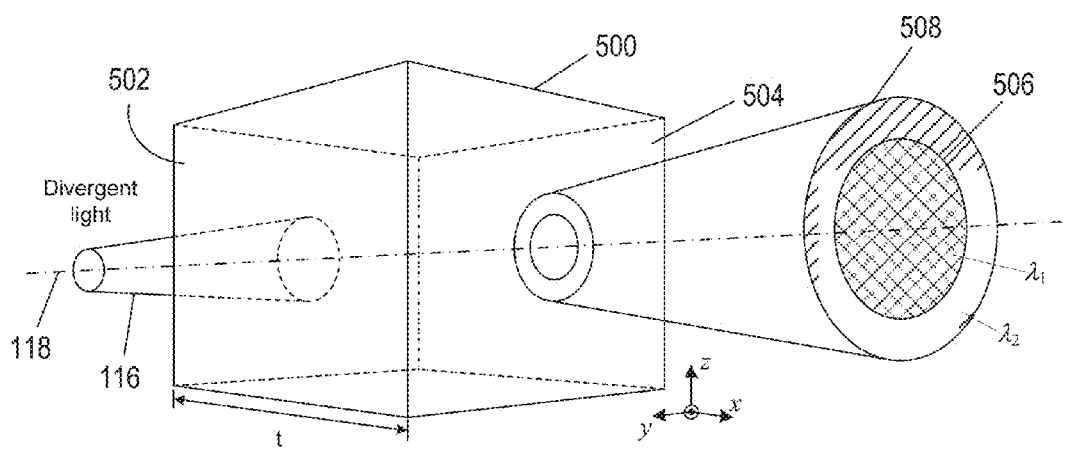
FIG. 5A shows a perspective view of an example correction element in the path of divergent excitation light.
Figure 5B:
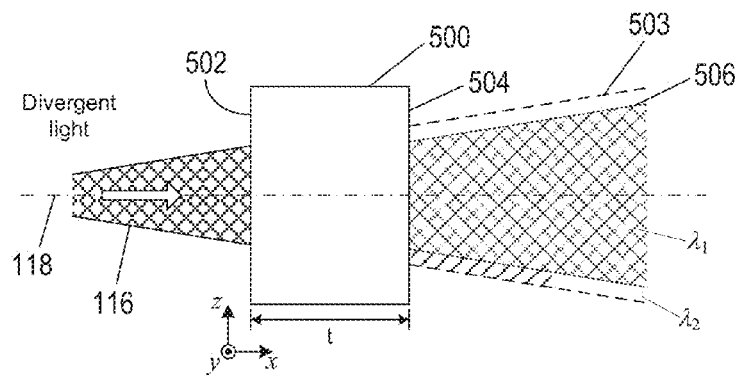
FIGS. 5B-5C show cross-sectional views of the correction element shown in FIG. 5A.
Figure 5C:
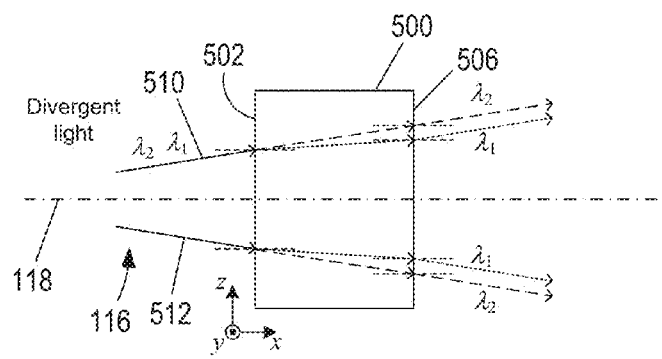

FIG. 5A shows a perspective view of an example correction element 500, and FIGS. 5B-5C show xz-plane cross-sectional views of the element 500. In the example of FIG. 5, the element 500 is a rectangular cuboid with two highly-polished, substantially-parallel opposing surfaces 502 and 504. For the sake of simplicity and brevity in the following description, the light 116 is composed of a mixture of two wavelengths $\lambda_1$ and $\lambda_2$, where the wavelength $\lambda_1$ is shorter than the wavelength $\lambda_2$. As shown in FIGS. 5A-5B, the light 116 output from the aperture in the plate (not shown) is divergent, enters the element 500 through the surface 502, and is output from the opposing surface 504 with the light of wavelength $\lambda_1$ confined to a narrow cone of light 506 that lies entirely within a larger cone of light 508 with the wavelength $\lambda_2$. The smaller cone of light associated with the wavelength $\lambda_1$ is the result of the different refractive indices associated with each wavelength, which is determined by the kind of transparent material selected for the element 500. For visible light, the index of refraction n of most transparent materials decreases with increasing wavelength $\lambda$. For example, $n(\lambda_2) < n(\lambda_1)$. FIG. 5C shows how two rays 510 and 512 of mixed wavelengths $\lambda_1$ and $\lambda_2$ in the divergent light 116 are affected by the element 500 based on the different associated refractive indices. According to the law of refraction, $$\theta_{\lambda_1} = \sin^{-1}\left(\frac{\sin\theta_i}{n(\lambda_1)}\right) < \sin^{-1}\left(\frac{\sin\theta_i}{n(\lambda_2)}\right) = \theta_{\lambda_2}$$

where $\theta_i$ is the angle of incidence,
$\theta_{\lambda_1}$ is angle of refraction associated with the wavelength $\lambda_1$, and
$\theta_{\lambda_2}$ is angle of refraction associated with the wavelength $\lambda_2$.

In other words, as shown in FIG. 5C, light with the wavelength $\lambda_1$ is bent more toward the optical axis 118 than light with the wavelength $\lambda_2$, which results in the narrower cone of light associated with the wavelength $\lambda_1$. As a result, the focal point of the light of $\lambda_1$ is shifted farther downstream than the focal point of the light of $\lambda_2$. In other words, the focal point 306 associated with the wavelength is shifted closer to the back focal plane 122 of the objective lens 110. The degree to which the cone of light associated with the wavelength $\lambda_1$ is narrower than the cone of light associate with the wavelength $\lambda_2$ and thus the degree to which the focal point is shifted downstream is determined by the material selected for the element 500 and the thickness, t, between the substantially parallel surfaces 502 and 504.

Figure 6:
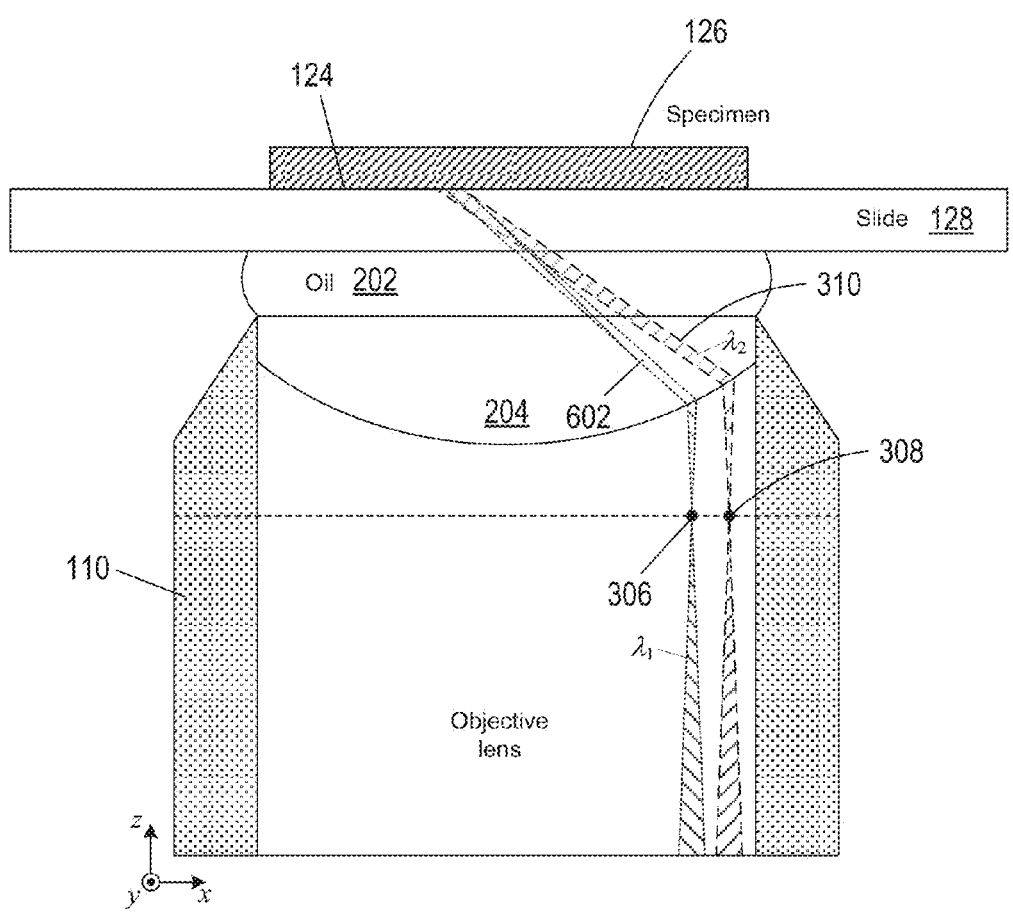
FIG. 6 shows an enlargement of an example objective lens and light having passed through a correction element.

When the element 500 is oriented so that the surfaces 502 and 504 are substantially perpendicular to the optical axis 118, as shown in FIGS. 5B and 5C, the element 500 corrects Problem 1 by focusing the various wavelengths sufficiently close to the objective lens back focal plane 122 so that each wavelength of light is a sufficiently collimated beam that strikes the interface. FIG. 6 shows an enlargement of the objective lens 110, described above with reference to FIG. 3, after light with the wavelengths $\lambda_1$ and $\lambda_2$ have passed through the correction element 500 shown in FIGS. 5A-5C. Because the focal point 306 of light with the wavelength $\lambda_1$ is shifted farther downstream with respect to the focal point 308 of light with the wavelength $\lambda_2$, both wavelengths are brought into sufficiently sharp focus at the objective lens back focal plane 122. In particular, light with the wavelength $\lambda_1$ is collimated into a beam 602. As a result, the beams 310 and 602 are collimated and intersect and overlap at the interface 124, which substantially corrects Problem 1

Figure 7A:
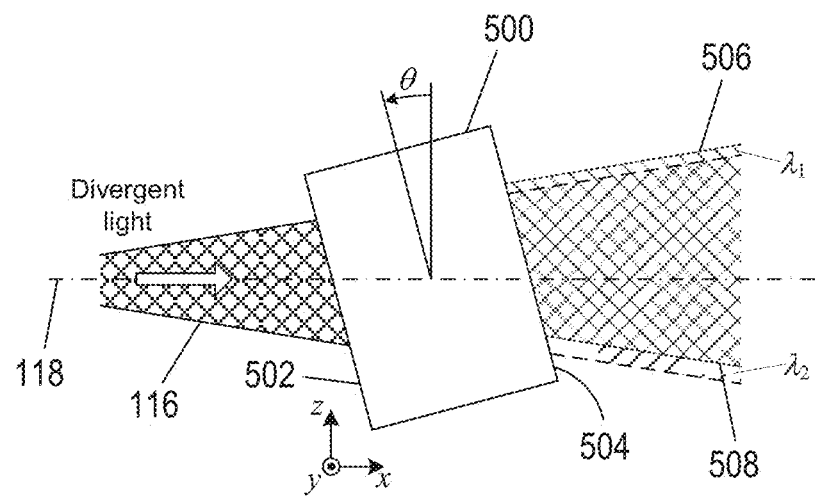
FIGS. 7A-7B show cross-sectional views of an example correction element in the path of divergent light and rotated through an angle.
Figure 7B:
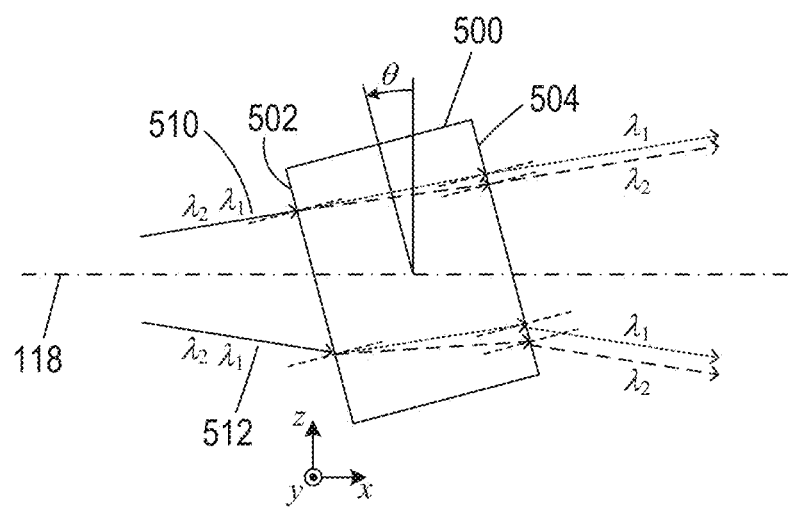

Although in the example of FIG. 6, the beam 602 is sufficiently collimated at the interface 124, the nominal angle of incidence is still less than the angle of incidence of the beam 310 because the objective lens 110 directs light with the wavelength $\lambda_2$ along a more peripheral trajectory. The trajectories of light with the wavelength $\lambda_1$ and the wavelength $\lambda_2$ can be brought together to overlap by rotating the element 500 through an appropriate angle. When the element 500 is rotated so that the face 502 is not longer perpendicular to the optical axis 118 the wavelengths output from the face 504 are shifted based on the wavelength. FIGS. 7A-7B show xz-plane cross-sectional views of the element 500 rotated through an angle $\theta$ in the xz-plane. In the example of FIGS. 7A-7B, the element 500 is rotated so that a portion of the cone of light associated with the wavelength $\lambda_1$ lies outside the cone of light associated with the longer wavelength $\lambda_2$. As shown in FIG. 7A, the light with the wavelengths $\lambda_1$ and $\lambda_2$ are laterally shifted with respect to one another. In other words, the cone of light associated with the wavelength $\lambda_1$ is shifted more strongly in the positive z-direction so that a portion of the cone lies outside of the cone of light associated with the wavelength $\lambda_2$. In FIG. 7B, light with the wavelength $\lambda_1$ is refracted with a larger angle of refraction than light with the wavelength $\lambda_2$, which results in the greater lateral translation associated with the wavelength $\lambda_1$. The relative lateral translation of the different wavelengths can be used to compensate for the translation that occurs within the objective lens to correct Problem 2.

Figure 8:
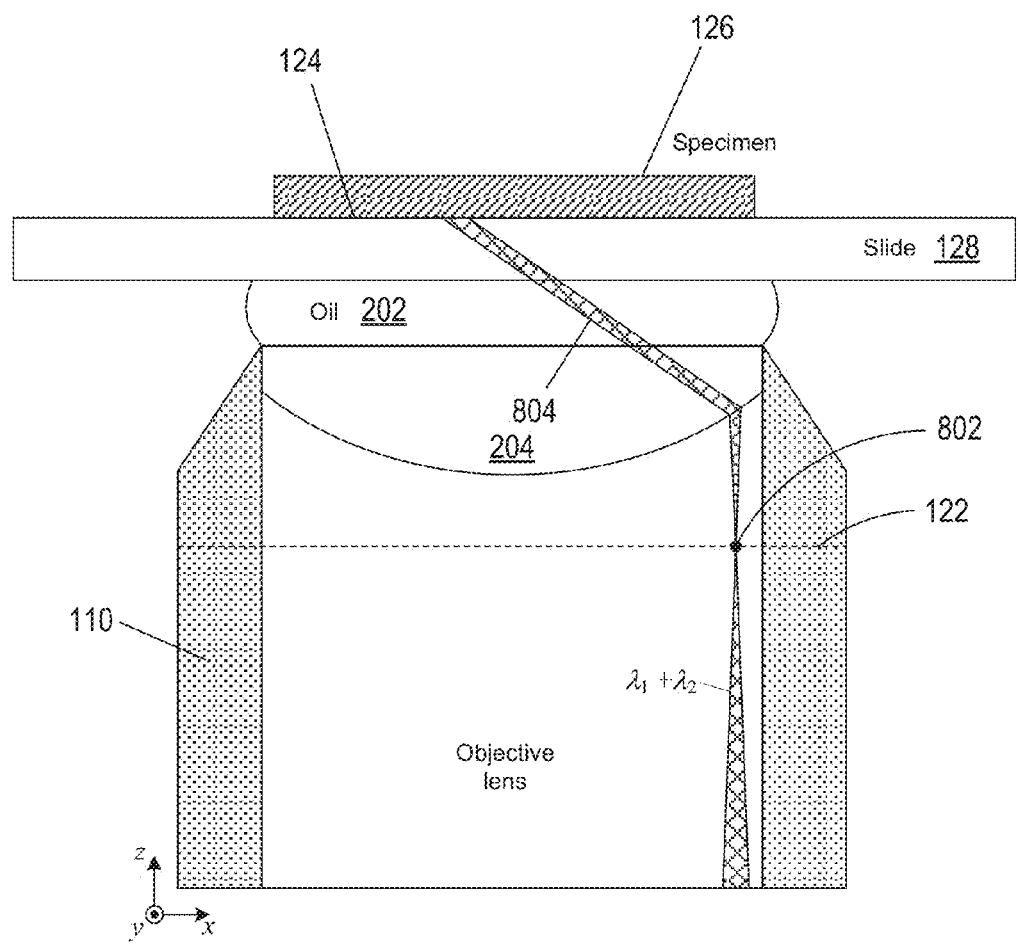
FIG. 8 shows an enlargement of an example objective lens and light having passed through a rotated correction element.

When the element 500 is rotated through a particular angle of rotation θ so that the surfaces 502 and 504 are not perpendicular to the optical axis 118, as shown in FIGS. 7A-7B, the element 500 corrects both Problems 1 and 2. FIG. 8 shows an enlargement of the objective lens 110, described above with reference to FIG. 3, after light with the wavelengths $\lambda_1$ and $\lambda_2$ have passed through the rotated correction element 500 described above with reference to FIGS. 7A-7B. The correction element 500 causes a better collimation of the shorter wavelength light $\lambda_1$, and the angle of rotation θ selected for the correction element 500 causes the wavelengths $\lambda_1$ and $\lambda_2$ to laterally shift with respect to one another. This compensates for the opposite shift that occurs within the objective lens which results in both beams having the same nominal angle of incidence. As shown in the example of FIG. 8, the beams with the wavelengths $\lambda_1$ and $\lambda_2$ overlap, have approximately the same focal point 802, and strike the interface 124 with approximately the same angle of incidence, which corrects Problem 2.

Figure 9:
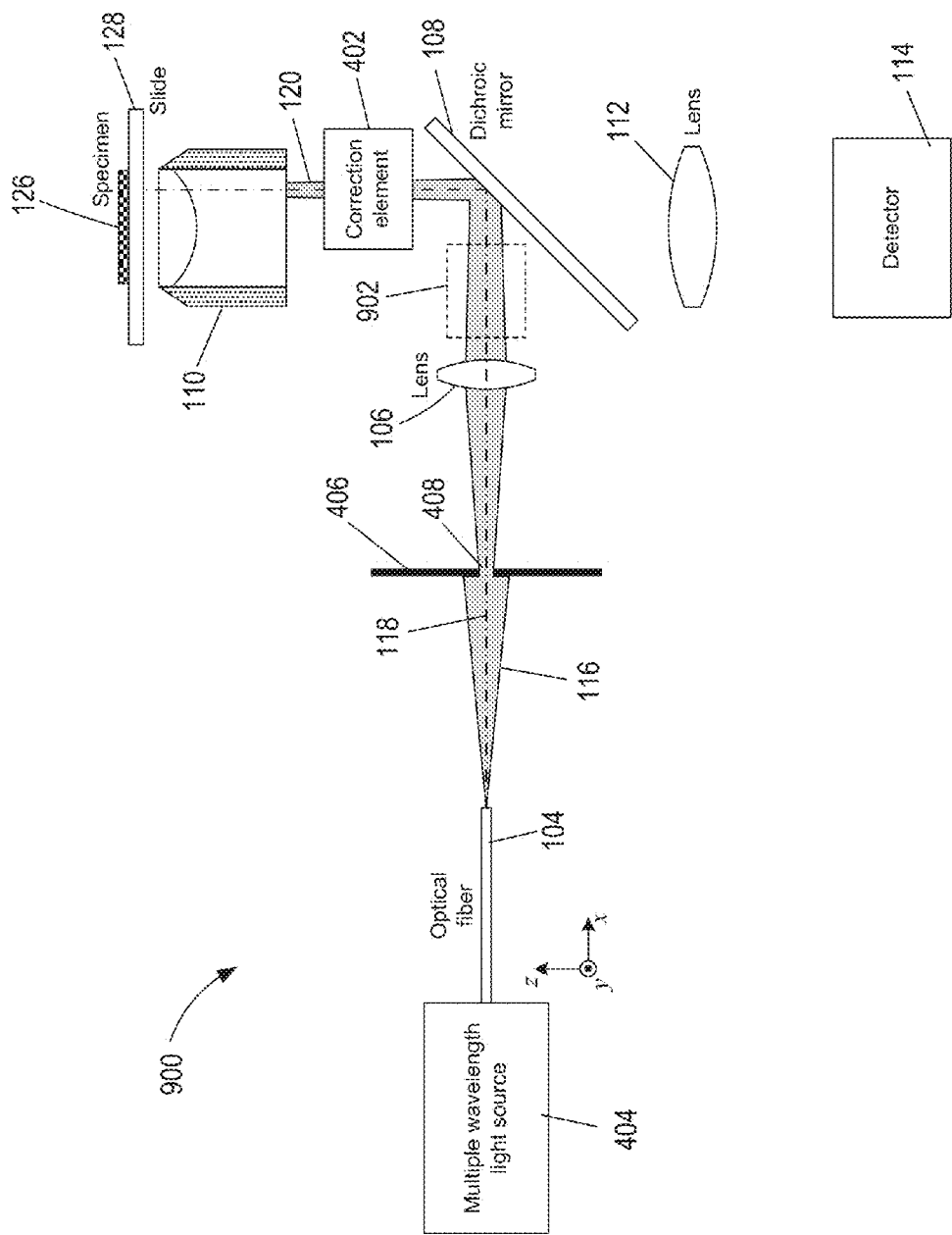
FIG. 9 shows a schematic representation of an example TIRF microscopy instrument that includes a correction element in the path of convergent excitation light.

A correction element can also be placed along the paths where the excitation light 116 is convergent. FIG. 9 shows a schematic representation of an example TIRF microscopy instrument 900 that includes the correction element 402 placed in the path of the light 116 where the light 116 is convergent. The instrument 900 is similar to the instrument 400 except the correction element 402 is placed along the optical axis 120 between the objective lens 110 and the dichroic mirror 108. Alternatively, dashed-line rectangle 902 represents where the correction element 402 can be place between the lens 106 and dichroic mirror 108, which is also a path where the light 116 is convergent. The correction element 402 as shown in FIG. 9 is also used to account for chromatic aberrations created in the objective lens 110, but because the light 116 is convergent, the longer wavelength has a smaller diameter cone than that of the shorter wavelength.

FIGS. 10A-10B show xz-plane cross-sectional views of the element 500 with the faces 502 and 504 oriented substantially perpendicular to an optical axis 1002 that represents either optical axis 118 or optical axis 120. As shown in FIGS. 10A-10B, the convergent light 116 enters the element 500 through the surface 502 and is output from the opposing surface 504 with the light of wavelength $\lambda_2$ confined to a narrow cone of light 1004 that lies entirely within a larger cone of light 1006 occupied by light of wavelength $\lambda_1$. In FIG. 10B, rays 1008 and 1010 represent light with a mixture of wavelengths $\lambda_1$ and $\lambda_2$. When rays 1008 and 1010 are incident on the surface 502, light with the wavelength $\lambda_2$ is bent more toward the optical axis 1002 than light with the wavelength $\lambda_1$, which results in the narrower cone of light associated with the wavelength $\lambda_2$. As described above, the degree to which the cone of light associated with the wavelength $\lambda_2$ is narrower than the cone of light associate with the wavelength $\lambda_1$ is determined by the material selected for the element 500 and the thickness, t, of the material between the substantially parallel surfaces 502 and 504.

FIGS. 11A-11B show xz-plane cross-sectional views of the element 500 rotated through an angle −θ in the xz-plane. In the example of FIGS. 11A-11B, the element 500 is rotated so that a portion of the cone of light associated with the wavelength $\lambda_2$ lies outside the cone of light associated with the shorter wavelength $\lambda_1$. As shown in FIG. 11A, the light with the wavelengths $\lambda_1$ and $\lambda_2$ are laterally shifted with respect to one another. In other words, the cone of light associated with the wavelength $\lambda_1$ is shifted more strongly in the positive z-direction so that a portion of the cone lies outside of the cone of light associated with the wavelength $\lambda_2$. In FIG. 11B, light with the wavelength $\lambda_1$ is refracted with a larger angle of refraction than light with the wavelength $\lambda_2$, which results in greater lateral translation associated with the wavelength $\lambda_1$.

Figure 12A:
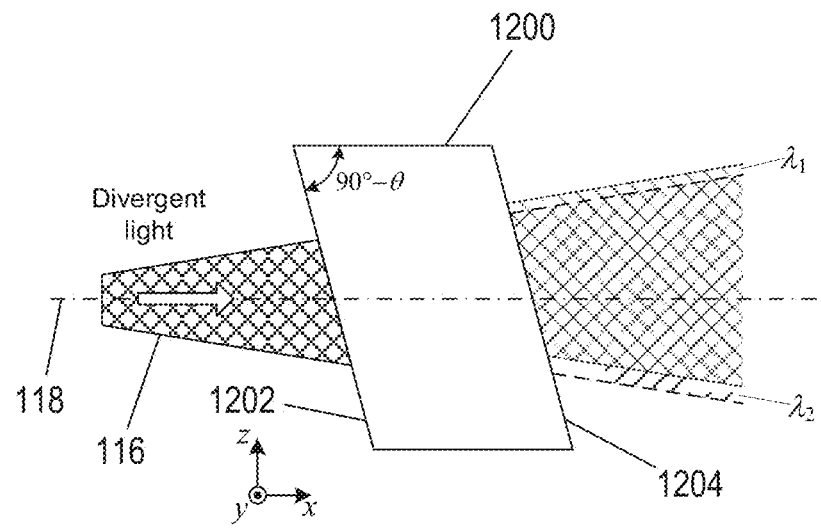
FIGS. 12A-12B show cross-sectional views of an example rhombohedron-shaped correction element in the path of divergent light.
Figure 12B:
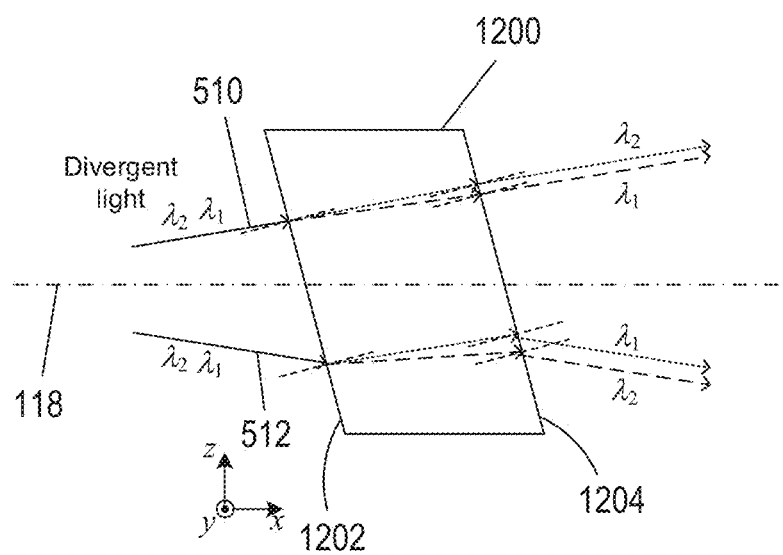

FIGS. 12A-12B show xz-plane cross-sectional views of an example correction element 1200. The element 1200 has a rhombohedron configuration with two opposing rhombus-shaped faces that lie in the xz-plane. In the example shown in FIGS. 12A-12B, element 1200 is positioned and configured so that highly-polished, substantially parallel surfaces 1202 and 1204 interact with the wavelengths in divergent light 116 in the same manner as the rotated correction element 500 described above with reference to FIGS. 7A and 7B.

The correction elements 500 and 1200 represent two examples of transparent, parallelepiped objects that can serve as the correction element 402 in a TIRF microscopy instrument. Other types of parallelepiped prisms can be selected to have a particular refractive index and desired thickness of the material between the parallel surfaces to produce a desired downstream affect on the different wavelengths that substantially corrects Problems 1 and 2.

Figure 13:
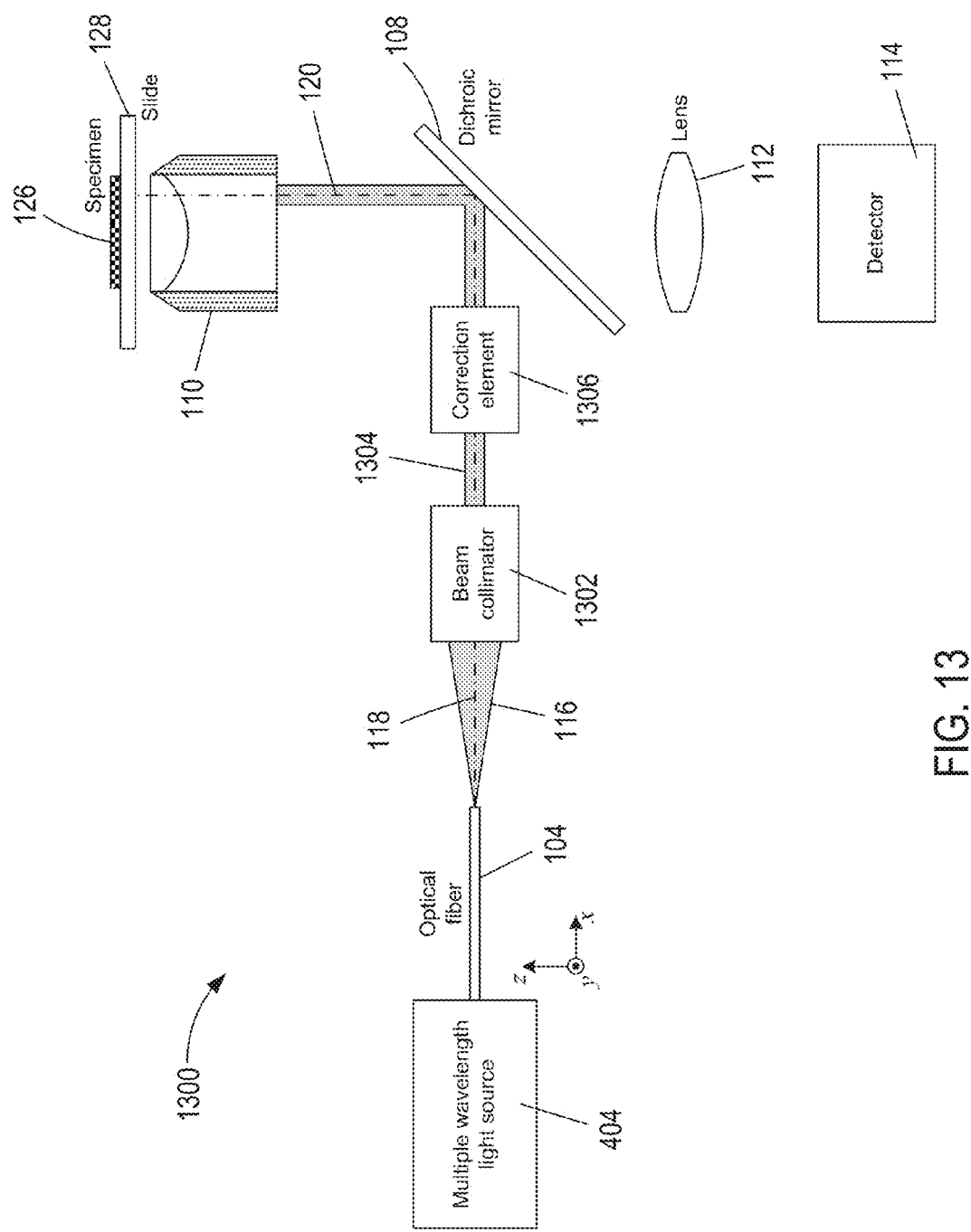
FIG. 13 shows a schematic representation of an example TIRF microscopy instrument with a correction element in the path of collimated excitation light.

A correction element can also be placed along the paths where excitation light is substantially collimated. FIG. 13 shows a schematic representation of an example TIRF microscopy instrument 1300. The instrument is similar to the instrument 400, except the instrument includes a beam collimator 1302, which can be a series of lenses and/or mirrors that convert the divergent light 116 output from the optical fiber 104 into a collimated beam 1304. The instrument 1300 also includes a correction element 1306 placed in the path of the collimated light 1304 to account for chromatic aberrations created by the objective lens 110. In the example of FIG. 13, the correction element 1306 is located between the beam collector 1302 and the dichroic mirror 108. Alternatively, the correction element can be located between the objective lens 110 and the dichroic minor 108.

Figure 14A:
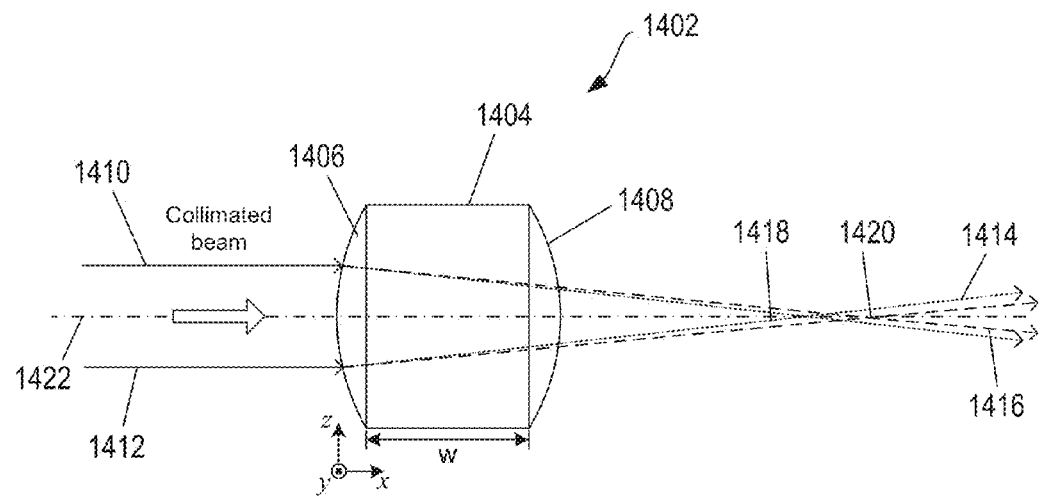
FIGS. 14A-14B shows cross-sectional views of an example correction element with lensed surfaces.
Figure 14B:
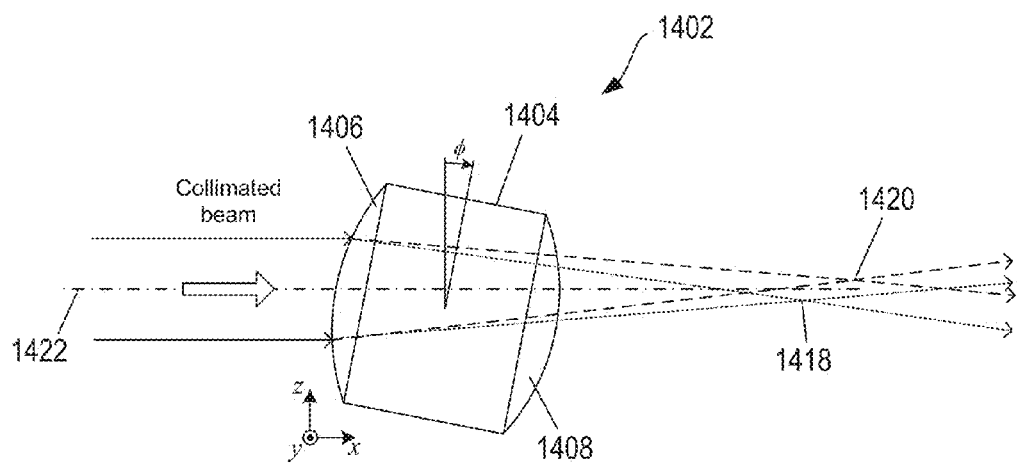

FIGS. 14A-14B shows xz-plane cross-sectional views of an example correction element 1402 to correct Problems 1 and 2. The element 1402 can be composed of a cylinder 1404 with convex-shaped ends 1406 and 1408 that operates as a bi-convex lens. The width, w, of the cylinder 1404 is selected so that the relative axial shifts in the downstream focal points in the light of different wavelengths can be appropriately tuned. Rays 1410 and 1412 represent light of composed of mixture of two wavelength in a collimated beam of light output from a multiple wavelength light source. In FIGS. 14A-14B, the two wavelengths are represented by differently patterned rays, with dotted-line rays, such as ray 1414, representing light with a short wavelength and dashed-line rays, such as ray 1416, representing light with a long wavelength. According the law of refraction, the wavelengths diverge with the shorter wavelength light having a smaller angle of refraction than the longer wavelength. As shown in FIG. 14A, when the light is directed parallel to the cylindrical axis of the cylinder 1404, the shorter wavelength is at a focal point 1418 and the longer wavelength is focused at a more downstream focal point 1420 that lie along optical axis 1422. This relative shift in focal points can be used to correct Problem 1 as described above with reference to FIG. 6. As shown in FIG. 14B, when the element 1402 is rotated so that the light is directed off of the cylindrical axis of the cylinder 1404, the focal points are shifted away from the axis 1422, and the light emerges in two separate beams of different wavelengths with the beams shifted laterally with respect to one another, which can be used to correct Problem 2.

Figure 15:
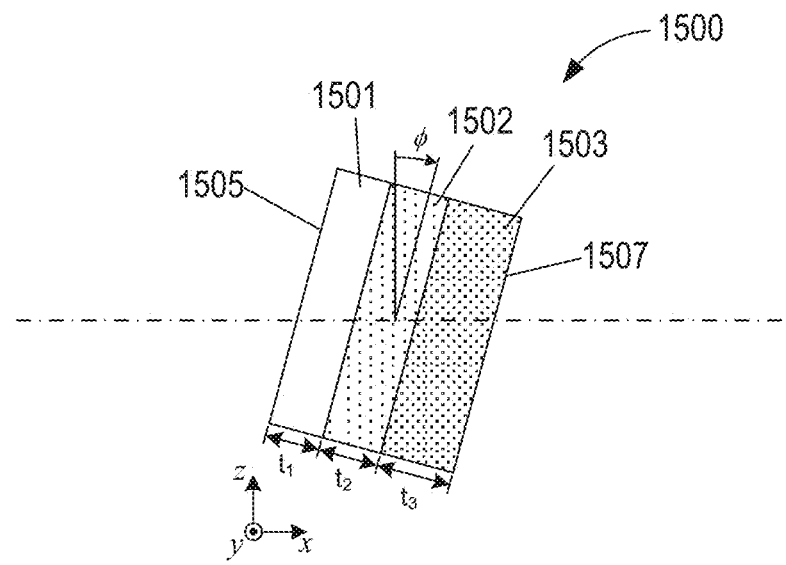
FIG. 15 shows a cross-sectional view of a correction element for divergent or convergent light.
Figure 16:
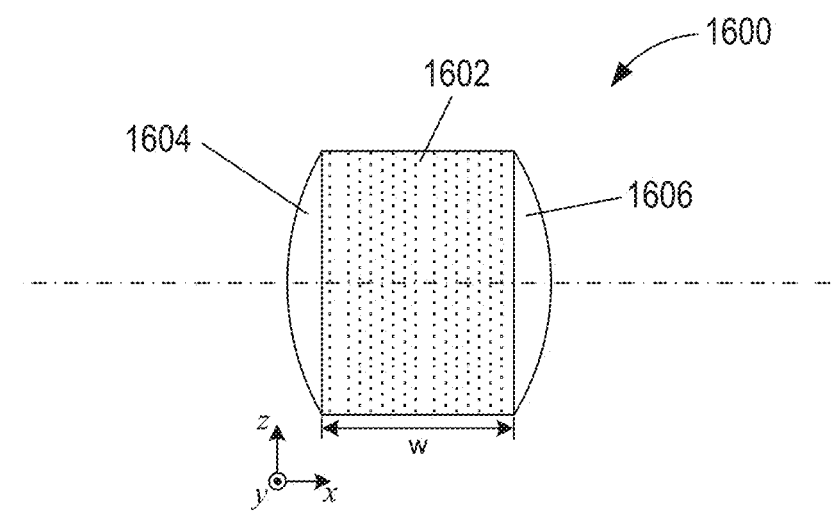
FIG. 16 shows a cross-sectional view of a correction element for collimated light.

In alternative embodiments, a correction element for divergent and convergent light can be composed of at least two different layers, each layer composed of a different transparent material and thickness. FIG. 15 shows an xz-plane cross-sectional view of a correction element 1500 that can be used with divergent or convergent light. The element 1500 includes three different layers 1501-1503, each layer composed of a different transparent material and having a different thickness. The surfaces 1505 and 1507 can be highly-polished and substantially parallel. For example, the layer 1501 can be composed of lanthanum dense flint glass, the layer 1502 can be composed of dense flint glass and the layer 1503 can be composed borosilicate crown glass, each of which has a different thickness. Alternatively, the central layer 1502 can be composed of air. In still other embodiments, a number of the layers of a multilayer correction element can be wedged-shaped and the surfaces that intersect the optical axis may not be parallel. In alternative embodiments, a correction element for collimated light can be composed of at least two different transparent materials. FIG. 16 shows an xz-plane cross-sectional view of a correction element 1600 that can be used with collimated light. The element 1600 includes a cylinder 1602 and two convex lensed ends 1604 and 1606. The cylinder 1602 and ends 1604 and 1606 can be each composed of any combination of different transparent materials. Alternatively, the cylinder 1602 can be composed of air and the lensed ends 1604 and 1606 can be plano-convex lenses.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

What is claimed is:

1. A fluorescent microscopy instrument to illuminate a specimen near a specimen/slide interface, the instrument comprising:
    an objective lens;
    a multiple wavelength light source to output at least two different wavelengths of excitation light directed to travel along a path located near edges of interior lenses of the objective lens; and
    a correction element to interact with the light transmitted between the source and the objective lens so that the light associated with each wavelength exits the objective lens to experience total internal reflection at a specimen/slide interface with a substantially uniform evanescent field penetration depth, and
    wherein the correction element intersects the light transmitted between the source and the objective lens so that the light associated with each wavelength is collimated as the light exits the objective lens and the columns of light substantially overlap at the interface with approximately the same angle of incidence.

2. The instrument of claim 1, further comprising:
    an optical fiber with a first end and a second end, the first end coupled to the source to receive the at least two different wavelengths of light and output the light through the second end;
    a dichroic mirror to reflect the excitation into the path and transmit fluorescent light emitted from fluorescently labeled components of the specimen and collimated by the objective lens; and
    a detector to receive the fluorescent transmitted through the dichroic mirror.

3. The instrument of claim 1, wherein the correction element further comprises a parallelpiped-shaped object with two substantially parallel surfaces positioned so that the faces intersect the light.

4. The instrument of claim 1, wherein when the light transmitted between the source and the objective lens is divergent or convergent, the correction element is a rectangular cuboid with two substantially parallel surfaces.

5. The instrument of claim 1, wherein when the light transmitted between the source and the objective lens is divergent or convergent, the correction element is a rhombohedron with two substantially parallel surfaces.

6. The instrument of claim 1, further comprising a beam collimator to collimate the light output from the source and the correction element further comprises a biconvex lens.

* * * * *